United States Patent [19]

Husaini

[11] Patent Number: 4,938,978

[45] Date of Patent: Jul. 3, 1990

[54] TREATMENT OF GREEN COFFEE

[75] Inventor: Saeed A. Husaini, Marysville, Ohio

[73] Assignee: Nestec S.A., Vevey, Switzerland

[21] Appl. No.: 265,266

[22] Filed: Oct. 31, 1988

[51] Int. Cl.$^5$ ................................................ A23F 5/02
[52] U.S. Cl. .................................... 426/461; 426/595; 426/460
[58] Field of Search ......................... 426/461, 460, 595

[56] References Cited

U.S. PATENT DOCUMENTS

| | | |
|---|---|---|
| 2,278,473 | 4/1942 | Musher . |
| 2,712,501 | 7/1955 | Hale et al. . |
| 3,088,825 | 5/1963 | Topalian et al. . |
| 3,106,470 | 10/1963 | Spotholz . |
| 3,572,235 | 3/1971 | Nutting et al. . |
| 3,640,726 | 2/1972 | Bolt et al. . |
| 3,767,418 | 10/1973 | Ponzoni et al. . |
| 4,540,591 | 9/1985 | Dar et al. . |
| 4,671,964 | 6/1987 | Davidescu et al. . |

Primary Examiner—Joseph Golian
Attorney, Agent, or Firm—Vogt & O'Donnell

[57] ABSTRACT

The moisture content of green coffee beans is increased to at least about 25% to 30% by weight based upon the weight of the moisturized beans. The moisturized beans then are heated in the presence of a substantially inert gas atmosphere under a positive pressure at a temperature sufficient and for a time sufficient for hydrolyzing and pyrolyzing the beans while substantially avoiding charring the beans. The treated beans then are dried.

12 Claims, No Drawings

4,938,978

TREATMENT OF GREEN COFFEE

BACKGROUND OF THE INVENTION

The present invention relates to treatment of green coffee beans for preparing them for extraction for obtaining a beverage.

Techniques for treating green coffee beans for preparing the beans for extraction to obtain a beverage include a step which conventionally involves roasting green beans by heating them with hot gases for driving off free and bound water from the beans. This heating initiates and provides for a reaction known as pyrolysis which is essential for developing aromatic, flavor and color characteristics associated with roast and ground coffee. If the roasting conditions are not controlled appropriately, however, charring, or burning, of the coffee beans can occur which produces beans having undesirable aromatic and flavor characteristics. Upon extraction with water utilizing apparatus available to the consuming public, a yield of soluble coffee solids in the extraction brew which is on the order of from about 20% to about 25% by weight based upon the weight of the roasted beans is obtained.

As higher brew yields have been desired, various methods have been proposed to increase the yield of coffees to be extracted for the preparation of a beverage which include subjecting coffee beans to a hydrolysis reaction.

Additionally, it is well accepted that certain varieties of coffees provide extracts which have characteristics which limit their usefulness. Such varieties include "Robustas", for example, which when roasted with heated gases provide extracts which are commonly described as "earthy", "woody" and/or "rubbery", for example. More importantly, such coffees are characterized as being "harsh" and they also have a characteristic "bitterness".

As is apparent from the art, subjecting coffee beans to a hydrolysis reaction not only increases brew yields, but also alters or modifies at least some of the less desired characteristics of the less preferred or so-called low-grade varieties of coffee beans. As is generally accepted, hydrolysis is a reaction involving water and heat which cleaves chemical compounds. The hydrolysis reaction, however, provides beans which yield a brew which has significantly greater acidity than does a brew extracted from beans which merely have been roasted with hot gases. Roasting hydrolyzed beans with hot gases, however, tends to neutralize the increased acidity which makes extracts obtained from them more palatable, but at the same time, this roasting also decreases the yield increase resultant from the hydrolysis reaction.

A process which is said to produce more flavor and strength than prior conventionally roasted products is disclosed in U.S. Pat. No. 2,278,473. In that process, green coffee beans are placed in a chamber and subjected to an injection of steam at elevated pressure and temperature. After the steam treatment, the pressure is released quickly for exploding the beans for providing a cell-disrupted structure. The treated beans then are roasted with heat in an oven. It is taught that the moisture content of the steam treated beans should be below 20% to 25% for enabling the required explosion.

Another process for increasing the yield from green coffee beans is disclosed in U.S. Pat. No. 2,712,501 for obtaining an extract for preparing soluble coffee. After subjecting green beans to saturated steam in a closed vessel, the pressure is released slowly so that the treated coffee beans are not exploded or otherwise disintegrated. The beans then are extracted, but before dehydration to prepare the soluble coffee, the acidity of the extract is neutralized.

U.S. Pat. No. 3,572,235 discloses a process for enhancing flavor and aroma of certain coffees. Green beans first are contacted with steam under pressure under substantially non-oxidizing conditions to raise the moisture content of the beans to from about 12% to about 18% by weight for causing a hydrolysis reaction and a partial roasting of the green beans. Upon completion of the steam treatment, the pressure is released for causing a sudden swelling or puffing of the beans. The treated beans then are contacted with hot roasting gases under substantially oxidizing conditions.

U.S Pat. No. 3,640,726 discloses a process in which green Robusta beans are placed in a pressure vessel and then, preferably, air is evacuated from the vessel by drawing a vacuum. The beans then are subjected to saturated steam under conditions described as essential for the beans to acquire a moisture content of from 15 weight percent to 35 weight percent and for partially roasting the beans. After steaming, the built-up pressure is released quickly. The treated beans then are subjected to roasting with circulating air at temperatures of at least about 190° C.

Other methods proposed for increasing the soluble solids yield of coffees are those disclosed in U.S. Pat. Nos. 3,088,825 and 3,106,470 which are said to increase the soluble solids yield by from about 10% to about 50% as compared with coffee which is conventionally roasted. It is disclosed that these methods also improve the acidity and flavor characteristics of the coffees.

The '825 patent discloses a two part cycle which comprises first preheating green beans with a hot gas, which reduces the moisture content of the beans, and then contacting the preheated beans with steam under pressure in an enclosed vessel after which the pressure is released suddenly for obtaining puffing and expansion. The '470 patent discloses a three-part cycle comprising the preheating step and the steaming and expansion step, as in the '825 patent, and then a further step of roasting with hot air for a short time which is said to reduce acidity and improve flavor. Use of super-heated steam is advised in each patent so the moisture content of the treated beans is kept to a minimum, such as below 8% by weight, as indicated by the '825 patent.

Still further methods proposed by inventors associated with the assignee of the '825 and '470 patents, to improve the flavor and aroma of coffee varieties such as Robusta coffees, are those disclosed and referred to in U.S. Pat. Nos. 3,767,418, 4,540,591 and 4,671,964.

In the '418 patent it is taught to mix water with green coffee beans, and then to steam the mixture in a confined pressure vessel at an elevated temperature of from about 115° C. to about 177° C. and at a critical steam pressure of from at least about 3.5 kg/cm$^2$ to below about 9.8 kg/cm$^2$ for obtaining treated beans having a moisture content of from about 35% to 55% by weight, but preferably from 40% to 50% by weight, based upon the weight of the wet treated beans. The treated beans are released from the pressure vessel in a manner in which they do not experience substantial puffing or expansion and then are roasted with heated air, but preferably, prior to roasting, the beans are air dried to below 15% moisture by weight.

The '591 patent provides a method for roasting Robusta coffee and blending it with higher quality coffees in which green beans are placed in a pressure vessel such that there is void space for providing room for expansion during steaming under pressure. During processing, gas and condensed steam are vented from the vessel for removing what is said to be undesired gases, for minimizing loss of soluble solids and for reducing acids and sour notes in the treated beans. After steam treatment, the treated beans are roasted with hot gases or by the process of the afore-mentioned '825 patent.

The '964 patent, which makes reference to the '418 and '591 patents, seeks to provide an "efficient method" for upgrading the quality of poor quality beans. Green beans are treated with steam to preheat the beans to a temperature of from about 115° C. to about 154° C. for about 0.5 min. to about 3 mins., which raises the moisture content of the beans in addition to preheating them. The pre-treated beans then are moisturized with preheated water to a moisture level of from about 35% to about 45% by weight, and then the moisturized beans are steamed at a temperature of from about 115° C. to about 154° C. at a pressure of from about 1.4 kg/cm$^2$ to about 4.9 kg/cm$^2$. The beans then are roasted in a conventional manner, preferably after drying which lowers the moisture content.

SUMMARY OF THE INVENTION

The present invention is characterized by increasing the moisture content of green coffee beans for obtaining moisturized beans having a moisture content of at least about 25% and preferably to at least about 30% by weight based on the total weight of the moisturized beans and heating the moisturized beans contained in the presence of a substantially inert gas atmosphere under a positive pressure at a temperature sufficient and for a time sufficient for hydrolyzing and pyrolyzing the beans while substantially avoiding charring the beans. The hydrolyzed and pyrolyzed beans then are dried to a stable moisture content which avoids staling. Preferably, the beans are agitated during at least the heat-treatment hydrolyzing and pyrolyzing step, agitation being defined herein as the beans being placed in a dynamic condition such that the beans being treated have movement relative to each other so that they are subjected to substantially the same treatment conditions. Conveniently, steam is applied to contact the moisturized beans in the heat-treatment step for heating them.

The process of the present invention produces beans which do not require roasting with hot gases. The treated beans have a dark brown color which penetrates into and through the body of the beans. Upon extraction with machines such as utilized in the home, for example, the treated beans provide an extraction yield of soluble solids in excess of 30% by weight, on a dry weight basis, of the beans extracted, and brew extraction yields on the order of from 38% to 42% soluble solids by weight may be obtained readily. Thus, the treated beans provide a substantially higher extraction yield upon brewing in comparison with like beans which have been roasted with hot circulating gases. The treated beans also provide a higher yield than do beans which have been hydrolyzed and then roasted with hot circulating gases because the roasting step decreases much of the increased yield obtained from the hydrolysis reaction. Likewise, it will be noted that if the treated beans of the present invention are subjected to such a roasting step, the brew extraction yield is reduced.

Additionally, the process of the present invention modifies the beans to provide beans which produce brews which have aromatic and flavor characteristics distinctly different from those obtained from like beans which have been roasted with heated gases or which have been steam roasted in a manner not in accordance with the present invention, which is believed due, particularly, to the employment of the inert gas atmosphere during processing. Even though the extracts obtained from the treated beans have significant acidity, this characteristic is utilized advantageously particularly when so-called low-grade coffees are treated although the process of this invention is not intended to be limited to treatment of only such coffees. In particular, because of the high acidity of extracts obtained from the treated beans, the treated beans are utilized advantageously to prepare blends of coffees in which the treated beans provide, or intensify, sensations of "bite" and "raspiness", in moderation, and "snap" and "wineyness" which commonly are associated with high quality coffees but which are not found generally in coffees generally regarded as being low-grade and inferior.

Thus, particularly, in the case of treating the so-called low-grade beans, the process of the present invention extends the usefulness of such beans and provides treated beans which provide not only a high yield but which also are capable of imparting aromatic and flavor characteristics which are not only compatible with the aromatic and flavor characteristics of high quality coffees but which also enhance desirable characteristics of the high quality coffees. In the case of Robusta beans, for example, the typical Robusta flavor characteristics are reduced substantially and the treated beans provide extracts which add characteristics and notes which provide a complex range of organoleptic sensations which are advantageous for preparing specialized blends adapted to a wide variety of consumer tastes.

The process of the present invention is characterized by two essential elements. The first element of importance is increasing the moisture content of the green beans to be heat-treated to at least about 25% and preferably to at least about 30% by weight based upon the total weight of the moisturized beans. The second element of importance is that the beans are contained in a substantially inert gas atmosphere when they are heated for generating the hydrolysis and pyrolysis reactions. It is believed that these elements enable the pyrolysis reaction, in particular, to be carried out to an extent, while substantially avoiding charring, which enables elimination of the necessity of a conventional roasting step, i.e., heating with hot gases, and the realization of the resulting high extraction brew yields and the realization of the aromatic and flavor characteristics, which particularly enable extending the usefulness of inexpensive, low-grade coffees, although the process of this invention is not intended to be limited to treatment of only such coffees.

For purposes of this disclosure and claims, "positive pressure" is intended to mean a pressure in excess of atmospheric pressure, and more particularly, a positive gauge pressure.

For purposes of this disclosure and claims, the term "charring" is intended to mean that a chemical decomposition of the coffee beans, which is familiar to the artisan, has occurred. If charring occurs, the color of the beans approaches a charcoal to black coloration by reason of formation of carbonaceous substances, and a burnt taste and/or odor is imparted to the beans.

For objective evaluation of whether charring is substantially avoided, for purposes of this disclosure, procedures and equipment are utilized as described in Publication 53 of the Coffee Brewing Institute (see also "Food Technology", Vol. 14, No. 11, p. 597 (1960)) for determining the color of samples, designated as "Gn", which will indicate charring. Samples which have a Gn of below about 1.8 are deemed to be charred. Thus, samples produced in accordance with this invention in which charring is substantially avoided have a Gn of about 1.8 and above. Desirably the products produced in accordance with this invention will have a Gn in the range of from about 2 to about 3.5. An acceptable roast color may have a Gn as high as about 5, however.

Generally, it is preferred to heat-treat moisturized beans having moisture contents of at least about 30% by weight, preferably above about 30% by weight, and most preferably from at least about 35% by weight to complete saturation because the hydrolysis and pyrolysis reactions are controlled more easily at the higher moisture contents. That is, in general, the lower the moisture content of the beans, the more gentle the applied reaction conditions usually should be, particularly for reasons of not only quality but for safety, because of the tendency of the reaction to become exothermic which may result in yielding not only charring but also increased temperatures resulting in pressure build-up in the heat-treatment vessel.

In accordance with the present invention, after moisturizing the beans and prior to heat-treating the moisturized beans, the moisturized beans are purged of the atmosphere surrounding them by introducing an inert gas into the vessel containing them. That is, the atmosphere of the vessel about the beans is such that gases other than inert gases, especially oxygen, substantially are excluded. Thus, a substantially inert atmosphere is maintained about the beans in the vessel. After purging, the vessel is closed off from the atmosphere and inert gas is introduced into the vessel to place the atmosphere of inert gas under a positive pressure. Although any positive pressure of an inert gas may be utilized and will provide for generation of the characteristics unique to the beans treated in accordance with this invention, present findings appear to indicate that significant alteration of aromatic and flavor characteristics of coffees treated in accordance with the procedures of this invention begin to appear at positive gauge pressures, measured at ambient temperature, of about 1.4 kg/cm$^2$ and above.

Characteristics of the final product also are related to the temperature and time of heating the moisturized beans for generating the hydrolysis and pyrolysis reactions. That is, the extent of hydrolysis and pyrolysis, which produces the increased extraction yield and promotes the aromatics and flavor characteristics and the coloration of the treated beans, is related to the temperature and time of heating in the heat-treatment step.

For achieving hydrolysis and pyrolysis while substantially avoiding charring in accordance with this invention, when utilizing the moisture contents indicated above, although heat-treating temperatures on the order of from about 130° C. to about 185° C. and even above 185° C. may be applied to the moisturized beans, temperatures on the order of from about 150° C. to about 180° C. are preferred. Temperatures of from about 175° C. to about 180° C. are most preferred. The length of time of heating required is generally in an inverse relationship to the temperature applied and generally is on the order of from about 5 mins. to about an hour or more. That is, generally, the higher the bean temperature for treatment, the shorter the time of heating and vice versa.

After heat-treating the moisturized beans, drying of the hydrolyzed and pyrolyzed beans may be accomplished with conventional drying means, such as with dryers which have means to pass hot air over and/or through a bed of the treated hydrolyzed and pyrolyzed beans.

In further embodiments of the invention, the moisturized green beans are saturated with moisture, and a liquid comprising at least water, i.e., excess moisture, is present when heat-treating is commenced. The liquid may be resultant from the moisturizing step by reason of water being added in an amount in excess of that which the beans can absorb and contain or by reason of being added after the moisturization step in an amount in excess of that which the beans can absorb and contain. In these further embodiments, the moisturized beans are heat-treated together with the liquid in the substantially inert gas atmosphere under a positive pressure, as disclosed above. During the heat-treatment, soluble bean solids are transferred from the beans to the liquid resulting in a brown liquid comprising water and soluble bean solids being present with the heat-treated beans. The resultant brown liquid and heat-treated beans are separated, and then the beans are dried, as above. The liquid then is incorporated into the dried hydrolyzed and pyrolyzed beans by absorption and adsorption, and the beans having absorbed water and adsorbed solids then are dried, as above.

These and other features and advantages will become further apparent from the following Detailed Description of the Invention and Examples.

DETAILED DESCRIPTION OF THE INVENTION

Increasing the moisture content of the green coffee beans to at least about 25% and preferably to at least about 30% by weight, and preferably to at least about 30% and up to complete saturation, may be accomplished conveniently in any suitable vessel by soaking the beans in water or other aqueous medium, and preferably by soaking with agitation and application of heat which will assist in obtaining uniformity of moisturization and shorten the time required for moisture absorption by the beans. Advantageously, the beans are heated to from at least about 40° C. and may be heated up to about 100° C.

In addition to utilizing merely water for moisturizing the beans, aqueous extracts of green or roasted beans and aqueous condensates, such as may be collected from evaporating aqueous coffee extracts, and combinations of aqueous extracts and aqueous condensates are utilized advantageously for moisturizing the beans, as such liquids contain volatiles and acids which can contribute to improved olfactory and organoleptic properties of the final treated product. In the case where extracts are utilized, the extracts preferably have a low soluble solids content. Aqueous extracts having solids contents of up to about 10% to about 15% by weight are utilized advantageously. Extracts having solids contents of up to about 20% to about 25% or higher can be utilized, but it is more difficult for these higher solids amounts to be incorporated with the beans and solids losses may be incurred because of decreased incorporation efficiency.

Equipment for moisturizing the beans can be of simple design and may comprise various types of vessels. A jacketed vessel, wherein heat is supplied to the jacket such as by steam, may be utilized conveniently although various sources of heat including contacting the beans with steam for heating them also may be utilized readily. However, even if steam is utilized to contact and heat the beans, preferably, the vessel is jacketed and heat is supplied also to the jacket, for obtaining uniform heating of the beans. To determine the temperature of the beans, a probe may be affixed within the vessel for contact with the beans. It is preferred that the vessel be closed to minimize potential volatiles losses during the moisturizing step, particularly when aqueous condensate and/or extract are utilized as the moisturizing medium, and of course, when temperatures of about 100° C., or greater, are utilized or when steam is contacted with the beans for heating the beans.

The vessel also preferably is capable of agitating the beans to assist also in obtaining uniform moisturization. Although the vessel may be provided with a stirring device to agitate the beans, a tumbling action is preferred. If stirring is utilized, a stirrer may be rotated at about 30 RPM to about 50 RPM. If the vessel is tumbled, it may be tumbled at from about 1 RPM to about 10 RPM, for example.

The amount of water required for moisturizing the beans may be determined readily by equating it by weight with regard to the weight of green coffee beans to be treated since it is accepted, generally, that green beans can contain substantially equal amounts of water and dry matter by weight. Of course, as the artisan will appreciate, the amount of water taken up will be affected by the initial moisture content of the green beans and not all green beans will conform with the general rule. Thus, it is possible that some beans may absorb water and be substantially saturated when water comprises only 45% or so by weight based on the total weight of the moisturized beans, for example, while other beans may absorb and contain moisture such that water comprises up to some 60% by weight based upon the total weight of the moisturized beans. Moreover, even the same variety of beans may vary from batch to batch in regard of the amount of water the beans can absorb and contain. Thus, for uniformity of results, the artisan will desire to test the beans to be treated for determining their moisture absorbing and containing capacity.

After moisturization of the green beans, the heat-treatment step may be carried out in the vessel utilized for the moisturizing step if, of course, that vessel is constructed such that it will withstand the pressures utilized; otherwise, the moisturized beans and any excess liquid are transferred to a suitable pressure vessel. Inert gas supply and maintenance of a positive pressure for providing the substantially inert atmosphere under positive pressure may be achieved by well-known means. Further, in addition to the means disclosed herein for carrying out the moisturizing and heat-treating steps, means disclosed in a commonly assigned U.S. patent application, Ser. No. 07/265,059, of David L. Belville, et al., entitled Green Coffee Treatment, also may be utilized advantageously.

With the moisturized beans in the heating pressure vessel, an inert gas is introduced into the vessel about the beans to purge the atmosphere of the vessel about the beans. After the atmosphere of the vessel is purged and is substantially comprised of the inert gas, the vessel is closed off from the atmosphere, and inert gas is introduced to apply a positive pressure. As noted above, any positive pressure may be applied, but preferably, the vessel is charged with the inert gas to a gauge pressure at ambient temperature of at least about 1.4 kg/cm$^2$ and preferably to from about 2 kg/cm$^2$ to about 3.5 kg/cm$^2$. Pressures up to 5 kg/cm$^2$ or even higher may be utilized, but present findings do not indicate that there is significant quality improvement or other advantage in imparting positive pressures above about 3.5 kg/cm$^2$, as the benefits of the present invention appear to increase and be optimized at pressures up to and at about 3.5 kg/cm$^2$ and then level off at pressures higher than 3.5 kg/cm$^2$. Moreover, use of such higher pressures is limited for reasons of safety by the ability of typical vessels to withstand the pressures built up during the heat-treatment step.

In regard of the pressures created, care should be taken by the artisan during the heating step to monitor the pressure in the vessel and avoid undue pressure build-up resultant from steam pressure generated and resultant from heating of the inert gas and gaseous products produced by the hydrolysis and pyrolysis reactions. If the pressure rises significantly during heat-treatment and particularly if it approaches the capacity of the vessel, the pressure should be reduced by venting the vessel.

Any inert gas, which includes carbon dioxide, nitrogen, helium, argon, etc., and combinations thereof, may be utilized. Carbon dioxide is preferred.

After the vessel has been pressurized, heat is applied to the beans for heating them to the desired treatment temperature which may be determined by means such as, in the moisturization step above, a probe in contact with the beans in the vessel. As with the moisturization step, heat may be supplied conveniently solely by the jacket of a jacketed vessel or by a combination of steam contacting the beans and a heated jacket or by other appropriate heat source means. Although agitation of the beans is not required during the heat-treatment step, again, such is preferred as it reduces the potential for localized heating of beans, and again, although stirring can be utilized, a gentle tumbling action is preferred at the rates stated for the moisturization step.

In general, depending to some extent on the means for supplying heat to the beans and whether the beans have been heated during the moisturization step, after the heat-treatment step is begun, the beans reach the heat-treatment temperatures of from about 130° C. to about 185° C., and preferably from about 150° C. to about 180° C. within from about 5 mins. to about 30 mins. That is, if heat is supplied only by a jacket, it may take from 15 mins. to 30 mins. for the beans to reach the heat-treatment temperature, whereas if a combination of a jacketed vessel and injection of steam into the vessel for contacting the beans with steam for heating them is utilized, the beans may reach the desired heat-treatment temperature more quickly, such as on the order of from 5 mins. to 15 mins.

After the beans have reached the desired temperatures, heating times on the order of from about 5 mins. to an hour or more and preferably from about 10 mins. to about 30 mins. are utilized. Temperatures on the order of about 175° C. to 180° C. with treatment times on the order of from about 10 mins. to about 20 mins. are preferred. In general, although temperatures of about 185° C. and above can be utilized, such are less preferred because of the probability of increased pressure buildup during treatment and charring of the beans. Thus, shorter heat-treatment times on the order of below 10 mins. are advisedly utilized at such temperatures. Although less efficient, temperatures from about 130° C. to about 150° C. also may be utilized, however, longer heating times, which may exceed one hour usually are required at such lower temperatures.

After the heat-treating step, preferably, the pressure extant in the vessel is released and reduced gradually to avoid bursting or breaking of the hydrolyzed and pyrolyzed beans. Other than preferably gently releasing the pressure from the heating vessel prior to obtaining the beans for drying, no special precautions need be taken with the heat-treated beans, although it is advisable not to allow the beans to remain in the atmosphere for extended periods of time.

Particularly, when steam is utilized for contacting the beans for heating them during the heat-treatment step, if the beans are not fully saturated with water, generally, the beans tend to absorb any condensed moisture and adsorb any solids leached or extracted from the beans, and any condensate remaining tends to adhere to the beans and not provide significant amounts of free liquid. However, if water or other aqueous medium is present in excess during heat-treatment, or if the beans have been moisturized to an extent to which they are saturated or approach saturation with water, free liquid may be present after heat-treatment which is incorporated in the treated beans.

In the case when there is not any liquid present during and after heating the beans, that is, the moisturized beans treated have a moisture content of about at least from 25% and preferably to at least 30% moisture but are not fully saturated with moisture such that liquid comprising water and water-soluble solids is not present after heating, the hydrolyzed and pyrolyzed beans are collected and dried to a stable moisture content which may be on the order of from up to about 3% to about 5% by weight. Various conventional means may be utilized for drying. For example, a forced air dryer may be utilized conveniently to dry the heat-treated beans at temperatures of from about 65° C. to about 150° C., for example. The main criterion of drying is that the dried heat-treated hydrolyzed and pyrolyzed beans be dried to a stable moisture content such that staling during storage prior to consumption is avoided.

If the heat-treating step of the present invention is practiced with beans in the presence of liquid, i.e., excess moisture, that is, for example, water, an aqueous condensate, an aqueous extract or a combination of condensate and extract, the beans preferably are moisturized first to be saturated with moisture. Any amount of liquid may be present during the heat-treating step, but, practically, the amount of liquid is dictated by considerations of efficiency because water-soluble solids are transferred from the beans to the excess liquid during heat-treating and must be returned to the beans to avoid undue solids loss. If the leached or extracted solids are not returned to the beans, the yield increase feature of the present invention will be diminished. The same heat-treating conditions as set forth above are utilized for heat-treating the moisturized beans and liquid.

In these embodiments, the solids content of the liquid after the heating step is dependent upon whether the beans were initially saturated, the amount of water present in the liquid, whether or not merely water, or aqueous extract, or aqueous condensate initially comprised the liquid and upon the duration of heating. Generally, it is preferred that the liquid after heating contains less than about 20% solids by weight and preferably anywhere from about 1% to about 16% solids by weight. For example, it has been found that a weight of water about 2½ times the weight of the beans to be moisturized results, generally, after moisturization and then heat-treating, in a liquid having from about 15% to about 16% solids by weight. For practical purposes there appears to be no benefit in utilizing more than 200% to 300% excess liquid by weight in the heating step because of reasons of efficiency.

In these embodiments which result in liquid, that is, water and soluble solids, being present after heat-treating the beans, the liquid and the treated beans are separated by conventional means such as by straining with a screen, for example. After separation of the treated beans from the liquid, the hydrolyzed and pyrolyzed beans then are dried, as disclosed above, and the liquid then is incorporated into the dried treated beans by contacting the liquid and dried treated beans for absorbing the water and for adsorbing the solids.

Prior to contact with the dried treated beans, the liquid advantageously is concentrated to a solids content of from about 35% to 45% solids by weight. The concentrated liquid then is contacted with the dried treated beans for absorption of water and adsorption of the soluble solids. Although the liquid could be concentrated to solids contents higher than 35% to 45% solids by weight, at higher concentrations, it becomes more difficult to incorporate such with the dried beans and greater solids losses may occur.

Incorporation of the liquid into the dried treated beans is accomplished preferably with gentle agitation for avoiding damage to the beans and is performed at a temperature, preferably, of from about 60° C. to about 70° C. Lower temperatures can be utilized but such will entail longer times to achieve complete incorporation. Higher temperatures up to less than 100° C. can be utilized, but if water evaporates, a higher concentration of solids will result in the liquid and may affect the efficiency of adsorption of the solids by the treated beans, and volatiles may be lost particularly if not operating in a closed vessel. As with all treatment steps, operating in a closed vessel will reduce the potential for losses of volatiles.

The treated beans containing the absorbed liquid and adsorbed soluble solids then are dried by procedures such as disclosed above.

The beans treated in accordance with the disclosure of the embodiments above may be ground and extracted without further treatment of the product. Generally, the treated beans will not be utilized alone for the preparation of a beverage but will be blended with other coffees which have been processed such as by roasting with heated gases. Although not required, the treated beans may be further treated by roasting such as with heated gases, which may provide a more intense or defined full roast note, but as noted, the yield will be lowered.

EXAMPLES

The following Examples are illustrative of the invention. Parts and percentages are by weight unless otherwise indicated. The heating times are the time of treatment after the beans have been brought to the heat-treatment temperature. In determining "extraction yield", the amount of solids in the brew on a dry weight basis is utilized for calculating the extraction yield based upon the dry weight basis of the treated or roasted coffee extracted.

EXAMPLE I

A first sample of about 500g of a Robusta green bean blend is soaked in a jacketed vessel heated by means of the jacket to about 70° C. with gentle tumbling agitation in about 500 ml of a coffee extract condensate until substantially no free liquid is present.

The soaked beans are placed in a jacketed vessel with about 750 ml of additional condensate. The vessel is purged and pressurized with carbon dioxide to a gauge pressure of about 3.5 kg/cm$^2$ (measured at room temperature) and then heated by means of the jacket and maintained at about 177° C. for about 15 mins. with gentle mechanical stirring.

After cooling and gradually releasing the pressure from the heating vessel, the beans, now dark brown, are present with a brown liquid. The brown liquid is separated from the beans. The heat-treated beans are dried in a forced hot air oven at about 80° C. to a moisture content of about 3%. The brown liquid which contains about 15% soluble solids is concentrated by evaporation to about 45% soluble solids.

The dried treated beans and concentrated liquid are mixed together, agitated and heated at about 65° C. so the beans absorb the liquids and adsorb the solids. The beans then are dried at about 80° C. in a forced hot air oven to a moisture content of about 3%.

The treated beans thus obtained are ground. The Gn of the ground beans is determined to be about 3.6. About 50 g of the treated ground beans are extracted with about 1420 ml water in a commercial automatic drip coffee maker. The extraction yield is about 42%.

EXAMPLE II

The same blend of green coffee beans as in Example I is utilized. The treatment conditions and amounts of materials are the same in this Example as in Example I, except that water is used in place of the condensate.

Upon grinding, the treated coffee provides an extraction yield of about 42%. The brew is analyzed for acidity and is found to contain about 5.2 mg titrable acids in the brew as acetic acid per 100 ml of the brew.

The brew is tasted and compared with an extract from the same blend of green beans which is roasted with hot gases. The brews are determined to be distinctly different, and the brew obtained from the beans in accordance with this example has less harsh and bitter characteristics and is distinctly more acidic than the brew which was obtained from the beans roasted with hot gases.

EXAMPLE III

A blend of about 11.4 kg Robusta green beans is tumbled and soaked and heated to about 71° C. in a steam-jacketed tumbler with about 11.4 kg of coffee extract condensate until substantially no free liquid remains.

The tumbler with the soaked beans is purged and pressurized with carbon dioxide to about 1.4 kg/cm$^2$ before heating. The beans are tumbled and heated by means of the jacket at about 149° C. for 1 hour. After heat-treating, there is substantially no free liquid in the tumbler.

The heat-treated beans, now dark brown, are dried and ground. The Gn is determined to be about 3.6.

The ground heat-treated dried beans are used for brewing in a commercial home automatic coffee maker without further roasting.

The extraction yield on brewing is about 35.5%.

EXAMPLE IV

A sample of about 250 g of Robusta green coffee beans containing about 10% moisture, is soaked in about 250 ml water and tumbled in a steam jacketed tumbler at about 60° C. until the liquid is absorbed by the beans. The soaked beans are placed in a pressure vessel with about 750 ml water and the vessel is purged and pressurized with nitrogen to a gauge pressure of about 3.5 kg/cm$^2$. The contents of the vessel are heated and mechanically stirred and maintained at 177° C. for 20 mins. The heat-treated beans and the brown liquid containing soluble bean solids are treated as described in Example I.

The Gn of the ground treated beans is about 3.6. The extraction yield is about 39.4%.

COMPARISON EXAMPLE I

Two batches of about 11.4 kg each of a blend of Robusta beans are soaked with an equal weight of water, heated to about 82° C. and tumbled for about 40 mins. One batch is heat-treated in a steam jacketed tumbler and tumbled for about 15 mins. at about 177° C. under a substantially inert atmosphere of carbon dioxide initially charged at a gauge pressure of about 3.5 kg/cm$^2$. The second batch is heated and tumbled at about 177° C. in the tumbler but without a carbon dioxide atmosphere.

The extraction brew yield of the batch treated in accordance with the present invention is about 42%. The extraction yield of the batch treated without introducing carbon dioxide is about 40%. The smell of the beans treated without introducing carbon dioxide is burned and relatively unpleasant as compared with the beans treated in the presence of carbon dioxide which have a comparatively mild aroma. Taste tests demonstrate that the extract from the beans treated in accordance with the present invention is distinctly different from the sample heat-treated without introducing carbon dioxide. The sample treated in accordance with the present invention provides an extract having less harsh Robusta characteristics and does not have the burnt notes that the extract obtained from the beans treated in air have.

EXAMPLE V

Two batches of a blend of Robusta green beans are heat-treated wherein the beans of one batch are moisturized to about 30% moisture by weight (Sample A) and the other batch contains about 35% moisture by weight (Sample B), each based upon the total weight of the moisturized beans. After purging, the initial inert gas pressure charged into a steam jacketed tumbler is at a gauge pressure of about 3.5 kg/cm$^2$. Each batch then is heated while tumbling to a treatment temperature of about 173° C. to about 174° C. and then maintained at that temperature with tumbling for about 5 mins.

Treated Sample A, upon grinding, provides coffee having a Gn of about 4.1 and an extraction yield of about 39%. Treated Sample B, upon grinding, provides coffee having a Gn of about 5.5 and an extraction yield of about 36%.

EXAMPLE VI

A batch of Robusta green beans is heat-treated wherein the moisturized beans have a moisture content of about 38% by weight based upon the weight of the moisturized beans. A jacketed tumbler is purged and initially charged with carbon dioxide to a gauge pressure of about 3.5 kg/cm$^2$. The moisturized beans are brought to a temperature of about 177° C. which is maintained while tumbling for about 30 mins.

Upon grinding, the treated beans have a Gn of about 2.2 and provide an extraction yield of about 41%.

EXAMPLE VII

Three batches of Robusta green beans are processed as follows with an initial heat-treatment inert gas gauge pressure charge of about 3.5 kg/cm$^2$ and heated for the designated times after reaching the designated temperatures.

| Batch | % Water In Beans | Temp °C. | Heating Time Mins. | Gn | Extraction Yield % |
|---|---|---|---|---|---|
| 1 | 50 | 179 | 15 | 2.3 | 42 |
| 2 | 50 | 176 | 30 | 1.9 | 39 |
| 3 | 50 | 163 | 30 | 4.3 | 35 |

From the foregoing, it will be apparent to one of ordinary skill that various equipment, conditions and parameters may be utilized for practicing the present invention without departing from the spirit and scope of the invention as defined by the following claims.

I claim:

1. A process for treating coffee beans comprising:
   increasing the moisture content of green coffee beans for obtaining moisturized beans having a moisture content of at least about 25% by weight based upon the total weight of the moisturized beans;
   heating the moisturized beans in a vessel containing the beans in the presence of a substantially inert gas atmosphere under a positive pressure at a temperature sufficient and for a time sufficient for hydrolyzing and pyrolyzing the moisturized beans while avoiding charring them; and then
   drying the hydrolyzed and pyrolyzed beans to a stable moisture content.

2. A process according to claim 1 further comprising agitating the moisturized beans while heating them for hydrolyzing and pyrolyzing the moisturized beans.

3. A process according to claim 1 wherein the substantially inert gas atmosphere is comprised of carbon dioxide.

4. A process according to claim 1 wherein the moisture content of the beans is increased by soaking the green beans in a liquid selected from a group consisting of water, an aqueous extract of coffee, an aqueous condensate obtained from coffee extract and combinations of extract and condensate.

5. A process according to claim 1 wherein the moisturized beans have a moisture content of from at least about 30% by weight to saturation with moisture and the positive pressure of the substantially inert atmosphere is initially charged to a gauge pressure measured at ambient temperature of at least about 1.4 kg/cm$^2$.

6. A process according to claim 1 wherein the moisturized beans are heated in the substantially inert atmosphere under pressure in the presence of an aqueous medium and which, after heating the moisturized beans for hydrolyzing and pyrolyzing the moisturized beans, further comprises separating the aqueous medium from the hydrolyzed and pyrolyzed beans, drying the hydrolyzed and pyrolyzed beans and then contacting the separated aqueous medium with the dried beans for obtaining absorption of water and adsorption of soluble solids of the aqueous medium by the dried beans and then drying the hydrolyzed and pyrolyzed beans containing absorbed water and adsorbed solids to a stable moisture content.

7. A process according to claim 6 further comprising concentrating the separated aqueous medium and then contacting the concentrated aqueous medium with the dried beans for obtaining absorption of water and adsorption of solids by the dried beans and then drying the hydrolyzed and pyrolyzed beans containing the absorbed water and adsorbed solids to a stable moisture content.

8. A process according to claim 6 wherein the aqueous medium is selected from a group consisting of water, aqueous coffee extract, aqueous condensate obtained from coffee extract and combinations of extract and condensate.

9. A process according to claim 1 wherein the beans are moisturized at a temperature of at least about 40° C., the positive pressure of the substantially inert gas atmosphere is initially charged to a gauge pressure measured at ambient temperature of from about 2 kg/cm$^2$ to about 3.5 kg/cm$^2$ and the moisturized beans are heated in the substantially inert atmosphere at a temperature of from about 150° C. to about 180° C.

10. A process for treating coffee beans comprising:
    increasing the moisture content of green coffee beans for obtaining moisturized beans having a moisture content of at least about 30% by weight based upon the total weight of the moisturized beans;
    introducing an inert gas about the moisturized beans in a vessel containing the beans for purging an air atmosphere from the moisturized beans for containing the moisturized beans in a substantially inert atmosphere;
    charging the substantially inert atmosphere about the moisturized beans to a gauge pressure of at least about 1.4 kg/cm$^2$;
    heating and agitating the moisturized beans in the pressurized substantially inert atmosphere at a temperature of from about 150° C. to 180° C. for a time sufficient for hydrolyzing and pyrolyzing the moisturized beans while avoiding charring them; and then
    drying the hydrolyzed and pyrolyzed beans to a stable moisture content.

11. A process according to claim 10 wherein the inert gas is carbon dioxide.

12. A process according to claim 10 further comprising agitating the green beans and heating the green beans to a temperature of at least 40° C. to 100° C. while increasing the moisture content of the green beans.

* * * * *